(12) United States Patent
Barron et al.

(10) Patent No.: US 8,794,852 B2
(45) Date of Patent: Aug. 5, 2014

(54) HYBRID FIBER OPTIC PIGTAIL ASSEMBLY

(75) Inventors: David Lopez Barron, Tamaulipas Reynosa (MX); Gabriela Medellin Ramos Clamont, Tamaulipas Reynosa (MX); William Julius McPhil Giraud, Azle, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/603,928

(22) Filed: Sep. 5, 2012

(65) Prior Publication Data

US 2013/0034330 A1    Feb. 7, 2013

Related U.S. Application Data

(63) Continuation of application No. PCT/US2011/027813, filed on Mar. 10, 2011.

(60) Provisional application No. 61/312,509, filed on Mar. 10, 2010.

(51) Int. Cl.
*G02B 6/255* (2006.01)
*G02B 6/44* (2006.01)

(52) U.S. Cl.
USPC ............................................. 385/96; 385/114

(58) Field of Classification Search
CPC ............................. G02B 6/4403; G02B 6/4454
USPC ..................................................... 385/96, 114
See application file for complete search history.

(56) References Cited

U.S. PATENT DOCUMENTS

| 4,568,145 | A | 2/1986 | Colin et al. |
| 5,048,914 | A | 9/1991 | Sneddon |
| 5,140,659 | A | 8/1992 | Minds et al. |
| 5,210,810 | A | 5/1993 | Darden et al. |
| 5,461,688 | A | 10/1995 | Lee |
| 5,473,715 | A | 12/1995 | Schofield et al. |

(Continued)

FOREIGN PATENT DOCUMENTS

| CH | 689434 A5 | 4/1999 |
| EP | 1199587 A1 | 4/2002 |

(Continued)

OTHER PUBLICATIONS

Mar. 10, 2011 International Search Report and Written Opinion issued in counterpart application PCT/US2011/027813.

(Continued)

*Primary Examiner* — Omar Rojas

(57) ABSTRACT

A pigtail cable assembly comprising a fiber optic cable having a plurality of optical fibers, a mid-section, a first end section and a second end section is disclosed. The plurality of optical fibers are separated from the fiber optic cable at the first end section. One of the plurality of the optical fibers at the second end section is adapted to be connected to a single fiber splice at a second end when single fiber splicing is intended. A sever site is located on the mid-section. The second end section may be severed from the mid-section at the sever site when mass splicing is intended. When the second end section is separated from the mid-section at the sever site the mid-section of the fiber optic cable is adapted to be connected to a mass splice at the sever site.

17 Claims, 9 Drawing Sheets

(56) References Cited

U.S. PATENT DOCUMENTS

| | | | |
|---|---|---|---|
| 5,542,015 | A | 7/1996 | Hultermans |
| 5,715,348 | A | 2/1998 | Falkenberg et al. |
| 5,722,842 | A | 3/1998 | Cairns |
| 5,754,724 | A | 5/1998 | Peterson et al. ............... 385/135 |
| 5,881,191 | A | 3/1999 | Liberty |
| 5,949,946 | A | 9/1999 | Debortoli et al. |
| 6,021,246 | A | 2/2000 | Koshiyama et al. |
| 6,264,374 | B1 | 7/2001 | Selfridge et al. |
| 6,364,539 | B1 | 4/2002 | Shahid |
| 6,385,374 | B2 | 5/2002 | Kropp |
| 6,533,465 | B1 | 3/2003 | Lesesky et al. |
| 6,736,545 | B2 | 5/2004 | Cairns et al. |
| 6,931,193 | B2 | 8/2005 | Barnes et al. |
| 6,952,530 | B2 | 10/2005 | Helvajian et al. |
| 6,974,262 | B1 | 12/2005 | Rickenbach |
| 7,074,066 | B2 | 7/2006 | Pepe |
| 7,118,284 | B2 | 10/2006 | Nakajima et al. |
| 7,220,065 | B2 | 5/2007 | Han et al. |
| 7,300,216 | B2 | 11/2007 | Morse et al. |
| 7,304,241 | B2 | 12/2007 | Trieb et al. |
| 7,738,759 | B2 | 6/2010 | Parikh et al. |
| 7,744,286 | B2 | 6/2010 | Lu et al. |
| 7,764,858 | B2 | 7/2010 | Bayazit et al. |
| 7,942,587 | B2 | 5/2011 | Barnes et al. |
| 8,107,785 | B2 | 1/2012 | Berglund et al. |
| 8,164,044 | B2 | 4/2012 | Mossman |
| 8,480,312 | B2 | 7/2013 | Smith et al. |
| 2003/0156798 | A1 | 8/2003 | Cull |
| 2005/0082467 | A1 | 4/2005 | Mossman |
| 2006/0133759 | A1* | 6/2006 | Mullaney et al. ............. 385/139 |
| 2006/0171639 | A1 | 8/2006 | Dye |
| 2007/0014522 | A1 | 1/2007 | Yamaguchi et al. |
| 2007/0263964 | A1 | 11/2007 | Cody et al. .................... 385/100 |
| 2008/0050070 | A1 | 2/2008 | Gurreri et al. |
| 2008/0175543 | A1 | 7/2008 | Durrant et al. |
| 2009/0148104 | A1 | 6/2009 | Lu et al. |
| 2009/0162016 | A1 | 6/2009 | Lu et al. |
| 2009/0245743 | A1 | 10/2009 | Cote et al. |
| 2010/0027955 | A1 | 2/2010 | Parikh et al. |
| 2010/0040331 | A1 | 2/2010 | Khemakhem et al. |
| 2010/0079759 | A1 | 4/2010 | Mossman |
| 2010/0129039 | A1 | 5/2010 | Smrha et al. |
| 2010/0303431 | A1 | 12/2010 | Cox et al. ...................... 385/135 |
| 2010/0329624 | A1* | 12/2010 | Zhou et al. .................... 385/135 |
| 2011/0123157 | A1 | 5/2011 | Belsan et al. |
| 2011/0200286 | A1 | 8/2011 | Smith et al. |
| 2011/0211326 | A1 | 9/2011 | Drouard et al. |
| 2011/0229083 | A1 | 9/2011 | Dainese Júnior et al. |
| 2012/0039571 | A1 | 2/2012 | Ciechomski et al. |

FOREIGN PATENT DOCUMENTS

| | | | |
|---|---|---|---|
| JP | 0772338 A | 3/1995 | |
| WO | 2005078493 A1 | 8/2005 | |
| WO | 2006/044080 | 4/2006 | ............... G02B 6/44 |
| WO | 2006/060250 | 6/2006 | ............... G02B 6/44 |
| WO | 2006123214 A1 | 11/2006 | |

OTHER PUBLICATIONS

Non-final Office Action for U.S. Appl. No. 13/302,067 mailed Jun. 7, 2013, 9 pages.

Final Office Action for U.S. Appl. No. 13/302,067 mailed Oct. 11, 2013, 11 pages.

Non-final Office Action for U.S. Appl. No. 13/014,229 mailed Sep. 23, 2013, 12 pages.

Applicant-Initiated Interview Summary for U.S. Appl. No. 13/014,229 mailed Jan. 31, 2014, 3 pages.

Advisory Action for U.S. Appl. No. 13/302,067 mailed Dec. 27, 2013, 3 pages.

Applicant-Initiated Interview Summary for U.S. Appl. No. 13/302,067 mailed Jan. 15, 2014, 3 pages.

Final Office Action for U.S. Appl. No. 13/302,067 mailed Jan. 27, 2014, 7 pages.

Advisory Action for U.S. Appl. No. 13/302,067 mailed Apr. 7, 2014, 3 pages.

Non-final Office Action for U.S. Appl. No. 13/741,529 mailed Jan. 27, 2014, 11 pages.

* cited by examiner

HYBRID FIBER OPTIC PIGTAIL ASSEMBLY

RELATED APPLICATIONS

This application is a continuation of International Application No. PCT/US11/27813 filed on Mar. 10, 2011, which claims the benefit of priority to U.S. Application No. 61/312,509 filed on Mar. 10, 2010, both applications being incorporated herein by reference.

BACKGROUND

1. Field of the Disclosure

The technology of the disclosure relates generally to fiber optic cable assemblies, and particularly to a hybrid fiber optic pigtail assembly that may terminate in a mass fusion splice or individual optical fiber splices.

2. Technical Background

Benefits of optical fiber use include extremely wide bandwidth and low noise operation. Because of these advantages, optical fiber is increasingly being used for a variety of applications, including but not limited to broadband voice, video, and data transmissions. Fiber optic networks employing optical fibers are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

The optical fibers used to interconnect the different optical components may be organized into optical cable assemblies to provide ease of installation, maintenance and routing. Some of the optical cable assemblies may be in the form of pigtail cable assemblies. Typically, pigtail cable assemblies comprise one or more optical fibers which are connectorized on one end but not on the other. The connectorized end of a pigtail may terminate at a connection point such as at an optical adapter to be optically connected with another optical fiber terminated at the optical adapter. The other end of the pigtail is not connectorized and may be spliced to other optical fibers. Thus, a pigtail cable assembly may allow for each optical fiber may be individually spliced. Alternatively, the pigtail cable assembly may allow for all of the optical fibers to be spliced as one using a mass splice, for example a mass fusion splice.

Depending on the application, a pigtail cable assembly allowing for individual fiber splicing may be used or a pigtail cable assembly allowing for mass optical fiber splicing may be used. For example, a pigtail cable assembly allowing for individual fiber splicing may be used in a fiber optic component used as a distribution point to provide downstream distribution of fiber optic service. As another example, a pigtail cable assembly allowing for mass optical fiber splicing may be used in an optical component receiving a optical feeder cable from an upstream fiber optic service source. Accordingly, different cable assemblies allowing for different type of splicing, individual optical fibers or mass optical fibers, are required depending on the application of the fiber optic component in which the pigtail assembly is positioned.

SUMMARY OF THE DETAILED DESCRIPTION

Embodiments disclosed in the detailed description include a pigtail cable assembly. The pigtail cable assembly comprises a fiber optic cable having a plurality of optical fibers, a mid-section, a first end section and a second end section. The first end section extends from one end of the mid-section where the plurality of optical fibers are separated from the fiber optic cable. One or more of the plurality of optical fibers are connectorized at a first end by fiber optic connectors. The second end section extends from the other end of the mid-section. The plurality of optical fibers are also separated from the fiber optic cable at the second end section other than via a furcation device. One of the plurality of the optical fibers at the second end section is adapted to be connected to a single fiber splice at a second end when single fiber splicing is intended. A sever site is located on the mid-section. The second end section may be severed from the mid-section at the sever site when mass splicing is intended. When the second end section is separated from the mid-section at the sever site the mid-section of the fiber optic cable is adapted to be connected to a mass splice at the sever site.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include a pigtail cable assembly. The pigtail cable assembly comprises a fiber optic cable having a plurality of optical fibers, a mid-section, a first end section and a second end section. The first end section extends from one end of the mid-section where the plurality of optical fibers are separated from the fiber optic cable. One or more of the plurality of optical fibers are connectorized at a first end by fiber optic connectors. The second end section extends from the other end of the mid-section. The plurality of optical fibers are also separated from the fiber optic cable at the second end section other than via a furcation device. One of the plurality of the optical fibers at the second end section is adapted to be connected to a single fiber splice at a second end when single fiber splicing is intended. A sever site is located on the mid-section. The second end section may be severed from the mid-section at the sever site when mass splicing is intended. When the second end section is separated from the mid-section at the sever site the mid-section of the fiber optic cable is adapted to be connected to a mass splice at the sever site.

Figure 1:
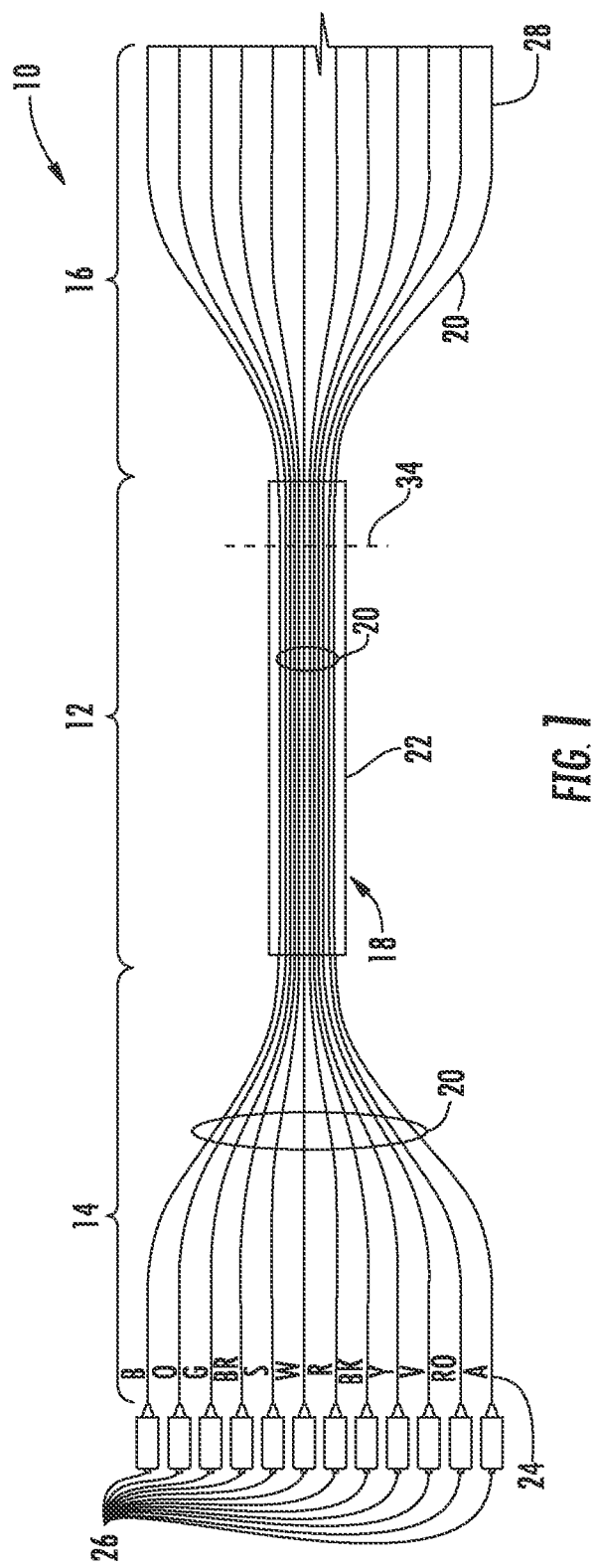
FIG. 1 is a diagram of an exemplary embodiment of a pigtail cable assembly having a mid-section, a first end section, a second end section and a sever site at the mid-section, wherein the mid-section is a fiber optic cable and the first end section and the second end section are individual separated optical fibers of the fiber optic cable.

In this regard, a pigtail cable assembly 10 according to an exemplary embodiment is illustrated in FIG. 1. The pigtail cable assembly 10 is a type of a hybrid fiber optic pigtail assembly allowing for single fiber and mass fiber connections and splicing with the need of a furcation piece or body. The pigtail cable assembly 10 has a mid-section 12, a first end section 14 and a second end section 16. The mid-section 12 may be in the form of a fiber optic cable 18 having a plurality of optical fibers 20. As an example, the fiber optic cable 18 may be a ribbon cable with the optical fibers 20 encased in a plastic matrix 22. When the matrix 22 is removed the individual optical fibers 20 may be severed. In this way, the pigtail cable assembly 10 is modifiable. This is illustrated in FIG. 1 at the first end section 14 and at the second end section 16, where the matrix 22 has been removed and the individual optical fibers 20, each having a fiber coating, are allowed to separate and route individually. The fiber optic cable 18 in FIG. 1 is shown as having 12 optical fibers 20. However, the pigtail cable assembly 10 may have any number of optical fibers 20. As non-limiting examples, the pigtail cable assembly may have two, six, eight, 16, 24 or 36 optical fibers 20. Additionally, the fiber coating of each of the optical fibers 20 may be color-coded. In FIG. 1, the color-coding is shown for the 12 optical fibers 20 of the pigtail cable assembly 10. In one embodiment, the optical fibers 20 may be color-coded in a 12 color sequence of blue (B), orange (O), green (G), brown (BR), slate (S), white (W), red (R), black (BK), yellow (Y), purple (V), rose (RO), and aqua (A). The individual optical fibers with the fiber coating and the color-coding may be about 250 µm in diameter.

A first end 24 of the optical fibers 20 at the first end section 14 is connectorized with fiber optic connectors 26, and therefore, adapted to be connected to a fiber optic adapted. One or more of the first ends 24 may be received in one end of a fiber optic adapter (not shown in FIG. 1) where the optical fiber 20 can optically connect to another optical fiber received by the other end of the fiber optic adapter. The fiber optic connectors may be any type. For instance, the connector type may include SC, LC, FC, or the like. At the second end section 16, second ends 28 of the optical fibers 20 are not connectorized.

In this way, one or more of the second ends 28 may be adapted to be individually spliced to other optical fibers or to other fiber optic components, for example, a splitter (not shown in FIG. 1). The pigtail cable assembly 10 may be any overall length with the mid-section 12, the first end section 14 and the second end section 16 being any lengths. As a non-limiting example, the mid-section 12 may be about 24 inches, the first end section 14 may be about 12 inches and the second end section 16 may be about 24 inches, for an overall pigtail cable assembly 10 length of 60 inches.

Figure 2:
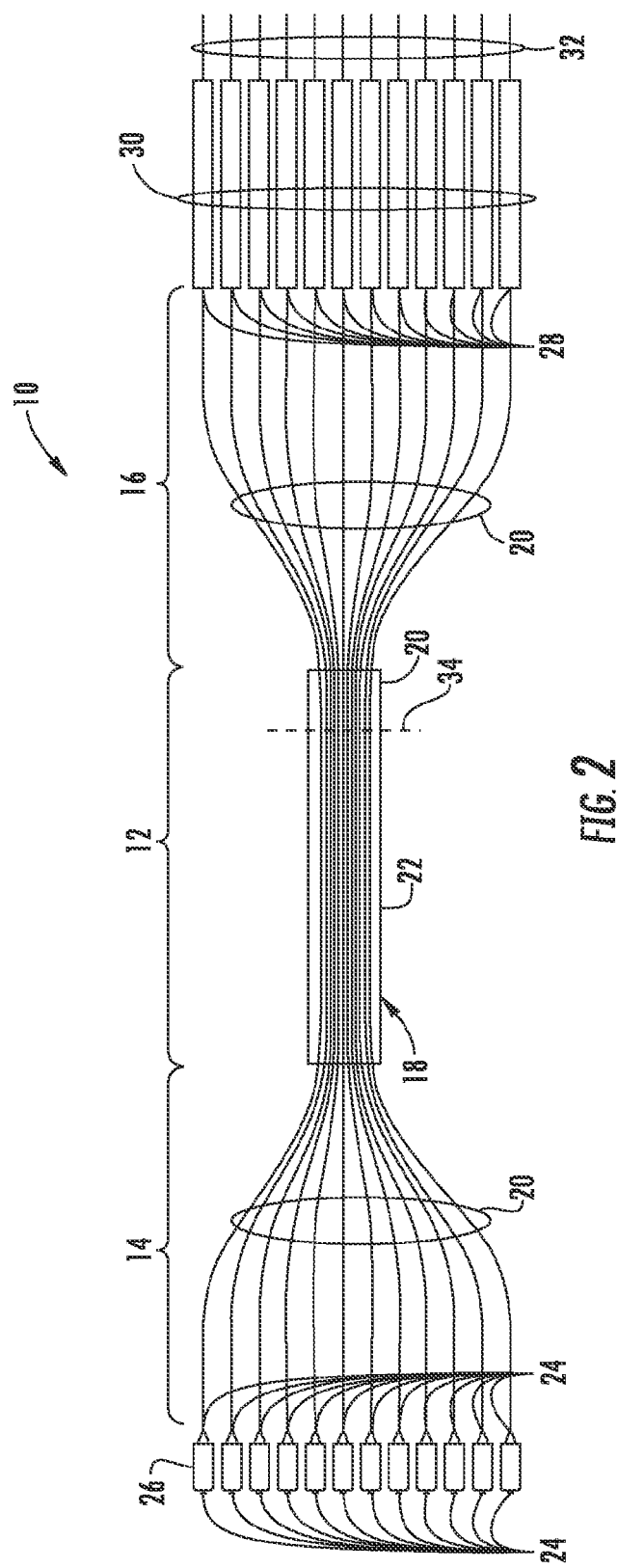
FIG. 2 is a diagram of the pigtail cable assembly of FIG. 1 with the optical fibers of the second end section optically connected to other optical fibers via single fiber splices.

In FIG. 2, each of the second ends 28 of the optical fibers 20 are shown terminated at a single fiber splice 30. In this manner, the optical fibers 20 may be adapted to be spliced to other optical fibers 32 to establish optical connection between optical fibers 20 and optical fibers 32. The splice may be a mechanical splice or a fusion splice. Any suitable mechanical splice may be used such as those available under the tradename UniCam® from Corning Cable Systems LLC of Hickory, N.C., but other suitable mechanical splice assemblies are possible.

Figure 3:
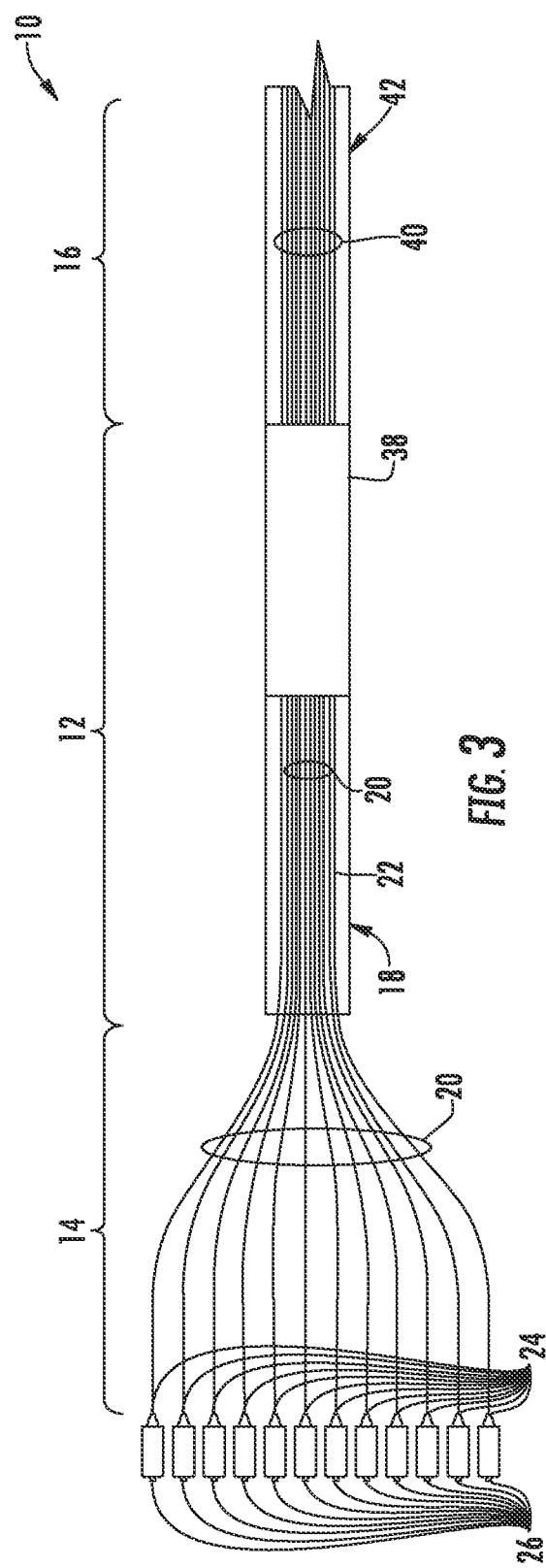
FIG. 3 is a diagram of the pigtail cable assembly of FIG. 1 with the second end section severed from the mid-section at the sever site and the fiber optic cable connected to another fiber optic cable via a mass splice.

Alternatively or additionally, the second end section 16 may be severed from the mid-section 12 at a sever site 34. The sever site 34 may be at any position along the length of the fiber optic cable 18 in the mid-section 12. In the case of the fiber optic cable 18 being a ribbon cable, the sever site may be in the mid-section 12 where the matrix 22 remains on the ribbon cable, i.e. has not been removed. Severing the second end section 16 from the mid-section 12 may be accomplished by any suitable means for severing the fiber optic cable 18, for example by cutting. After the second end section 16 is severed from the mid-section 12, the mid-section 12 may be terminated at a mass splice 38 as shown in FIG. 3. In other words, the mid-section 12 of the fiber optic cable 18 may be adapted to be connected to a mass splice at a sever point. The mass splice 38 may be any type of multi-cable splice including a mechanical splice or a mass fusion splice to splice the optical fibers 20 fiber optic cable 18 to optical fibers 40 of another fiber optic cable 42.

Figure 4:
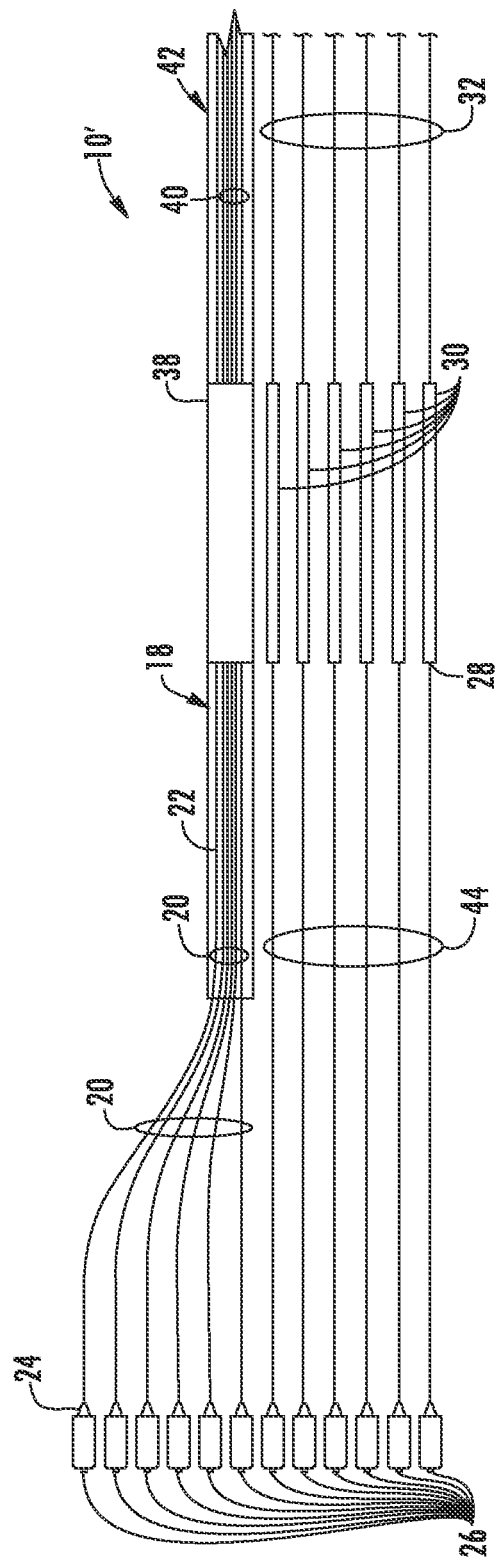
FIG. 4 is an exemplary embodiment of a pigtail tail cable assembly including the pigtail cable assembly of FIG. 1 optically connected to a fiber optic cable via a mass splice and a plurality of separate optical fibers optically connected to other optical fibers via single fiber splices.

Referring now to FIG. 4, there is illustrated another embodiment of a pigtail cable assembly 10' which is provided to show an embodiment that includes both a fiber optic cable and individual optical fibers in another form of a hybrid fiber optic pigtail assembly. The pigtail cable assembly 10' is shown comprising a fiber optic cable 18, shown as a ribbon cable, terminated at a mass splice 38 to optical fibers 40 of another fiber optic cable 42, and with optical fibers 20 terminated with fiber optic connectors 26 at a first end 24 as described with respect to FIG. 3. Additionally, a plurality of single connectorized optical fibers 44 each terminated with fiber optic connectors 26 at the first end 24. The second ends 28 of the optical fibers 20 are shown terminated at a single fiber splice 30 for splicing to other optical fibers 32 to establish optical connection between optical fibers 20 and optical fibers 32 as discussed above with respect to FIG. 2.

The pigtail cable assembly 10, 10' may be installed in fiber optic equipment, including, an enclosure, cassette, module, shelf, or the like. For purposes of facilitating discussion of the embodiments, the term "cassette" will be used, but it should be understood that any type of fiber optic equipment is contemplated by the embodiments. The cassette 50 may mount or position in other fiber optic equipment, including, but not limited to, a cabinet, enclosure, local connection point, fiber distribution hub, or the like.

Figure 5:
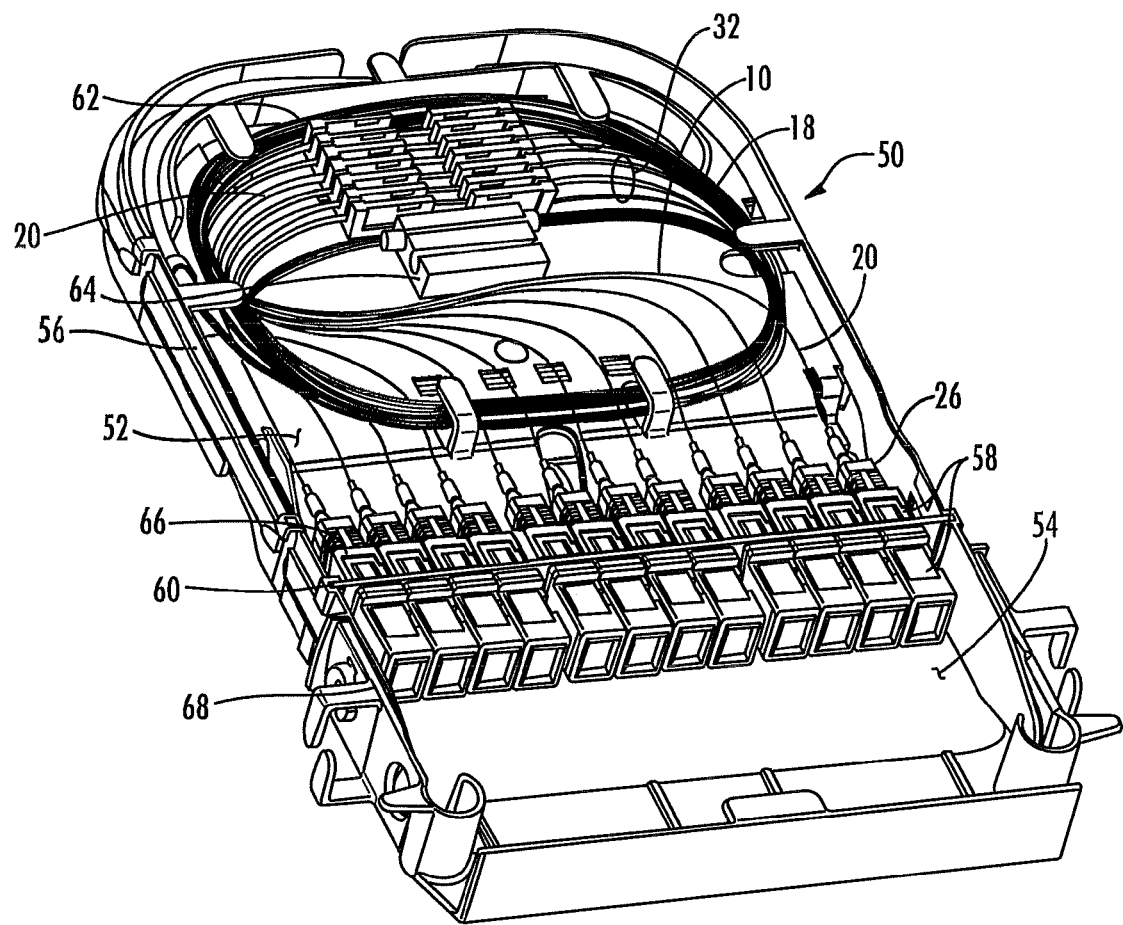
FIG. 5 is a top, perspective view of the inside of a cassette in which the pigtail cable assembly of FIG. 2 is positioned.
Figure 6:
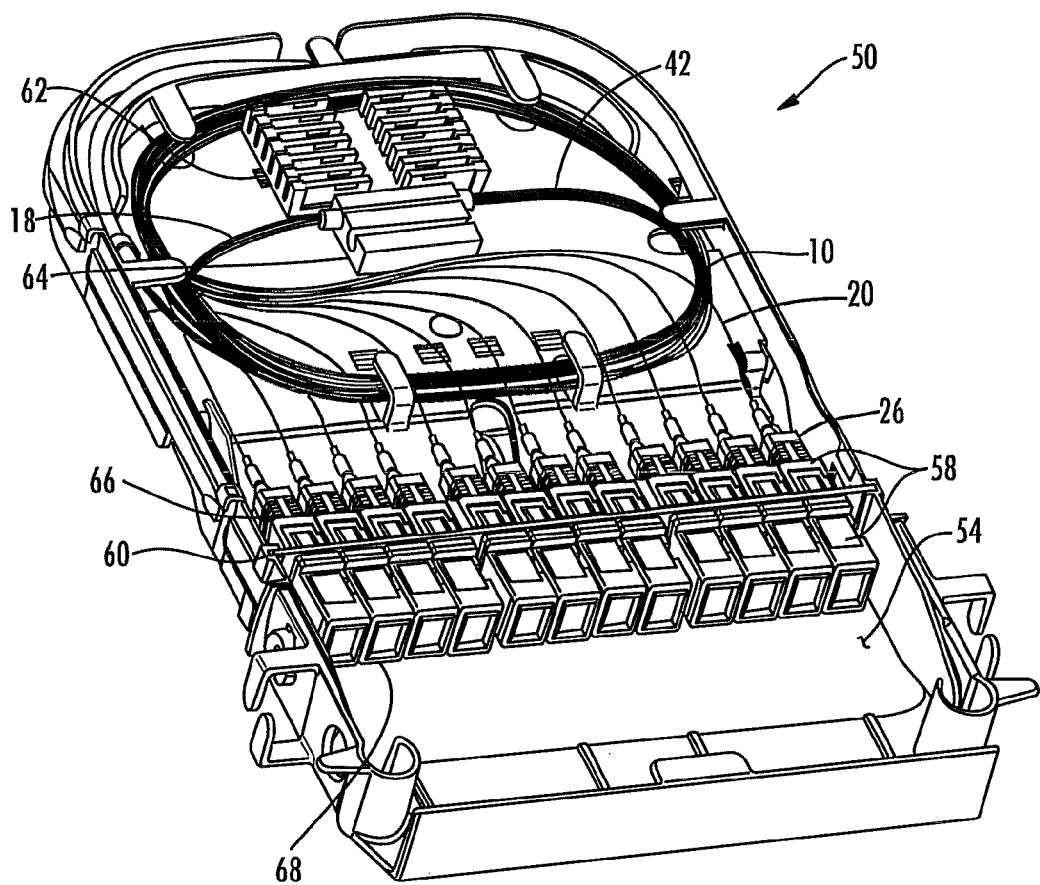
FIG. 6 is a top, perspective view of the inside of a cassette in which the pigtail cable assembly of FIG. 3 is positioned.
Figure 7:
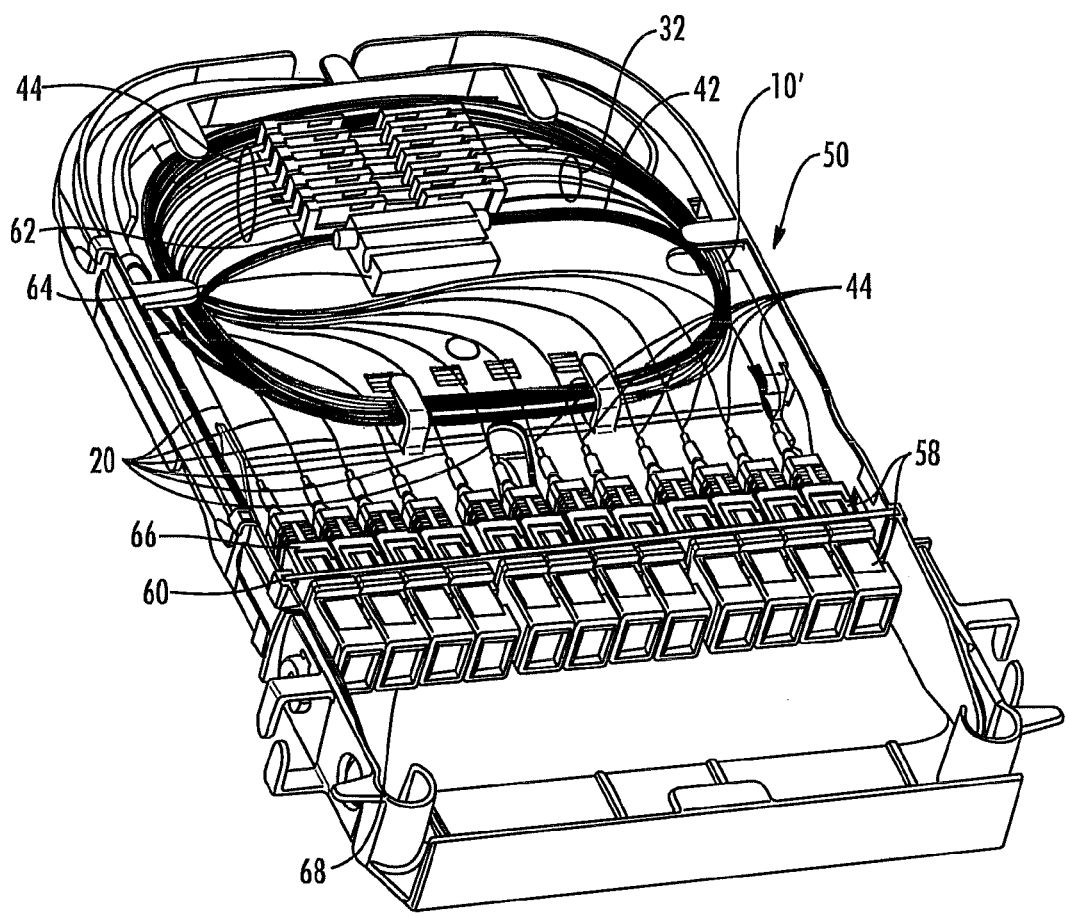
FIG. 7 is a top, perspective view of the inside of a cassette in which the pigtail cable assembly of FIG. 4 is positioned.

In this regard, FIGS. 5-7 illustrate embodiments of the pigtail cable assembly 10, 10' in a cassette 50. The cassette 50 has an interior 52, a front section 54 and a component section 56. Fiber optic adapters 58 mount through apertures in a face panel 60. The face panel 60 is positioned at the interface between the front section 52 and the component section 56 and acts to separate the front section 52 from the component section 56. Single fiber splice holder 62 and mass splice holder 64 position in the interior 52 in the component section 56. In FIGS. 5-7, the single splice holder 62 is shown as being able to hold twelve single fiber splices, two per section. However, the single splice holder 62 may hold any number of single splices. Similarly, the mass splice holder 64 is shown as being able to hold two mass splices, but the mass splice holder 64 may hold any number of mass splices.

Referring now to FIG. 5, the pigtail cable assembly 10 illustrated in FIG. 2 is shown positioned in the cassette 50. The optical fibers 20 route to the fiber optic adapters 58. The fiber optic adapters 58 receive the fiber optic connectors 26 at the ends 24 of the optical fibers 20 of the first end section 14. The fiber optic connectors 26 insert into an internal end 66 of the fiber optic adapters 58. Although not shown in FIG. 5, the fiber optic adapters 58 may also receive other connectorized optical fibers which would insert into an external end 68 of the fiber optic adapters 58. In this manner, an optical connection may be established between the optical fiber 20 and the other optical fiber received by the same fiber optic adapter 58.

The fiber optic cable 18, routes in the interior 56 in a manner to provide slack and other management of the fiber optic cable 18 and to facilitate the positioning of the optical fibers 20 of the second end section 16 for connection and/or termination at the one end of the single fiber splices 30 positioned in the single fiber splice holder 62. The optical fiber 20 may then be spliced to optical fiber 32 connected to the other end of the single fiber splice 30. Although not shown in FIG. 5, the optical fibers 32 may then route out of the cassette 50 to other optical components.

Referring now to FIG. 6, the pigtail cable assembly 10 illustrated in FIG. 3 is shown positioned in the cassette 50. The connection of the optical fibers 20 of the first end section 14 to the fiber optic adapters 58 is similar to that described with respect to FIG. 4, and, therefore will not be repeated here. In FIG. 5, the fiber optic cable 18 was severed at sever point 36 (not shown in FIG. 5) and, therefore, pigtail cable assembly 10 does not include a second end section 16. Instead, the fiber optic cable 18 routes to a mass splice holder 64 having a mass splice 38 positioned therein. The fiber optic cable 18 connects to and/or terminates at one end of the mass splice 38 and optically connects to another fiber optic cable 42 connects to and/or terminated at the other end of the mass splice 38. Although not shown in FIG. 6, the fiber optic cable 42 may then route out of the cassette 50 to other optical components.

FIG. 7 illustrated the pigtail cable assembly 10' of FIG. 4 in a cassette 50. As discussed with respect to FIG. 4, the pigtail cable assembly 10' includes a fiber optic cable 18 having optical fibers 20 and individual separate optical fibers 44. Both the optical fibers 20 and the optical fibers 44 are connectorized having a fiber optic connector 26 on their first end 24. The connection of the optical fibers 20 and the optical fibers 44 to the fiber optic adapters 58 is similar to that described above, and, therefore will not be repeated here. However, the embodiment illustrated in FIG. 7, includes the fiber optic cable 18 connecting to and/or terminating at the mass splice 38 in the mass fiber splice holder 64, and the individual optical fibers 44 connecting to and/or terminating at the single fiber splices 30 at the single fiber splice holder 62.

Any number of fiber optic cables 18 and optical fibers 20, 44 may be positioned in the cassette 50. Additionally, any number of single fiber splice holders 62 holding any number of single fiber splices 30 may be positioned in the component section 56 of the cassette 50. Similarly, any number of mass splice holders 64 holding any number of mass splices 38 may be positioned in the component section 56 of the cassette 50. Further, the cassette 50 may have one design and be used as a feeder cassette or a distribution cassette depending on whether the pigtail cable assembly 10 provides for mass splicing of the fiber optic cable 18, for example a ribbon cable, or individual splicing of the optical fibers. In other words, only one pigtail cable assembly 10 has to be provided and, whether a feeder cassette or a distribution cassette is needed, the second end section 16 may be severed or not severed at the sever point 36. Severing the second end section 16 can be performed at the factory or in the field.

Figure 8:
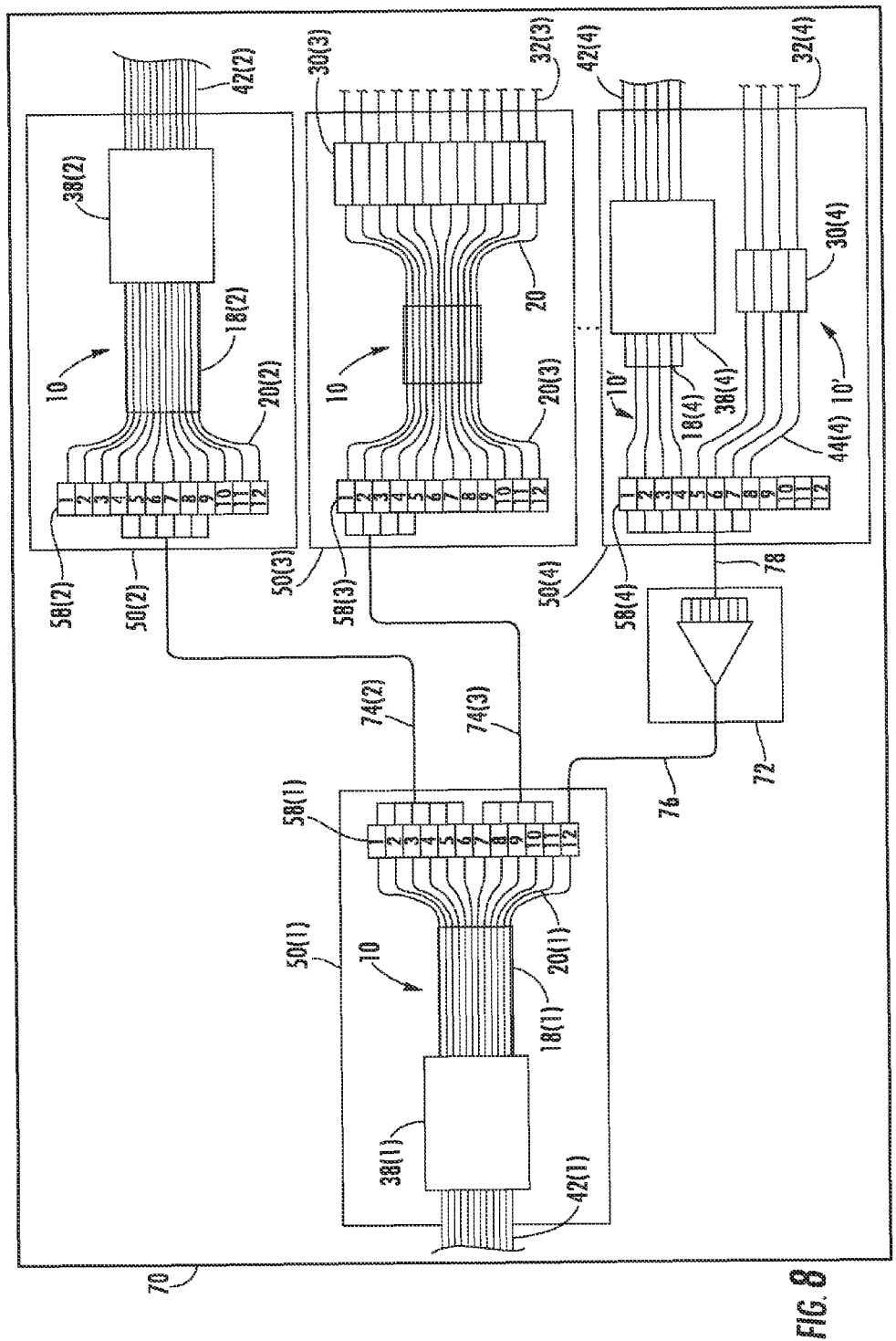
FIG. 8 is a diagram of cassettes located in a fiber optic enclosure.

FIG. 8 illustrates exemplary embodiments of ways in which the cassettes 50 may be used as both feeder cassettes and distribution cassettes. FIG. 8 is not intended to be inclusive and/or limiting of all the different ways the cassette 50 may be utilized and, accordingly, there are other ways and/or configurations for utilizing the cassette 50. The embodiment illustrated in FIG. 8 shows four cassettes 50(1), 50(2), 50(3) and 50(4) and an optical splitter 72 in an enclosure 70. The enclosure 70 may be any type or style of enclosure, cabinet, shelf, tray, housing, closure and the like. As non-limiting examples, the enclosure 70 may be a local convergence point, a fiber distribution hub, or any type of an optical terminal. The cassettes 50(1) and 50(2) include the pigtail cable assembly 10 configured as shown in FIGS. 3 and 6

The cassette 50(1) may be used as a feeder cassette receiving a feeder cable shown as the fiber optic cable 42(1). The fiber optic cable 42(1) may be a twelve fiber ribbon cable which is spliced to the fiber optic cable 18(1), which may also be a twelve (12) fiber ribbon cable. The fiber optic cable 42(1) is spliced to the fiber optic cable 18(1) by mass splice 38(1). The individual optical fibers 20(1) separate and connect to the internal ends of respective fiber optic adapters 58(1) in the cassette 50(1). Optical fibers 74(2) and 74(3), which may be in the form of individual jumpers or jumpers in a fiber optic cable, connect at one end to the external ends of the fiber optic adapters 58(1) to establish an optical connection between the optical fibers 20(1) and the optical fibers 74(2) and 74(3). Six optical fibers 20(1) optically connect to six optical fibers 74(2), and five optical fibers 20(1) optically connect to five optical fibers 74(3). In FIG. 8, the optical fibers 74(2) and 74(3) are shown routed to cassettes 50(2) and 50(3), respectively. One optical fiber 20(1) optically connects to a single optical fiber 76 and routes to optical splitter 72.

The six optical fibers 74(2) route to cassette 50(2) and connect to the external ends of fiber optic adapters 58(2) in cassette 50(2). In FIG. 8, the six optical fibers 74(2) are shown connected to fiber optic adapters 58(2) numbers 4, 5, 6, 7, and 8. Twelve optical fibers 20(2) from fiber optic cable 18(2) which may be a 12 fiber ribbon cable connect to the internal ends of the fiber optic adapters 58(2). In this way, optical connection is established between the six optical fibers 74(2) and six of the optical fibers of the 12 optical fibers 20(2) connected to the internal ends of the fiber optic adapters 58(2), numbers 4, 5, 6, 7 and 8. The six optical fibers 20(2) connected fiber optic adapters 58(2) numbers 1, 2, 3, 10, 11 and 12 are not optically connected to any fibers at the fiber optic adapters 58(2) and, therefore, may not be carrying any optical signal. The fiber optic cable 18(2) may be spliced to another fiber optic cable 42(2) by or via mass splice which may be another feeder cable or a distribution cable.

The five optical fibers 74(3) route to cassette 50(3) and connect to the external ends of fiber optic adapters 58(3) in cassette 50(3). In FIG. 8, the cassette 50(3) includes the pigtail cable assembly 10 configured as shown in FIGS. 2 and 5. The five optical fibers 74(3) are shown connected to fiber optic adapters 58(3) numbers 1, 2, 3, 4 and 5. Twelve optical fibers 20(3) from fiber optic cable 18(3) which may be a 12 fiber ribbon cable connect to the internal ends of the fiber optic adapters 58(2). In this way, optical connection is established between the five optical fibers 74(3) and five of the optical fibers of the 12 optical fibers 20(3) connected to the internal ends of the fiber optic adapters 58(3), numbers 1, 2, 3, 4 and 5. The seven optical fibers 20(3) connected fiber optic adapters 58(3) numbers 6, 7, 8, 9, 10, 11 and 12 are not optically connected to any fibers at the fiber optic adapters 58(3) and, therefore, may not be carrying any optical signal. The individual optical fibers 20(3) of the fiber optic cable 18(3) may be spliced to the optical fibers of another fiber optic cable 32(3) by or via single fiber splices 30(3). The optical fibers 32(3) may be distribution cables for routing to subscriber premises, as an example.

The single optical fiber 76 routes to the optical splitter 72, which in FIG. 8 is shown as a 1×8 optical splitter. The single optical fiber 76 may be a single fiber pigtail. The optical splitter 72 splits the optical signal carries by the single optical fiber 76 into 8 optical signals each carried by a separate optical fiber 78, thereby being 8 optical fibers 78. The optical fibers 78 may be single fiber pigtails or multi-fiber cable pigtails. The optical fibers 78 route to cassette 50(4) and connect to the external ends of fiber optic adapters 58(4) in cassette 50(4). In FIG. 8, the cassette 50(4) includes the pigtail cable assembly 10' configured as shown in FIGS. 4 and 7. The eight optical fibers 78 are shown connected to fiber optic adapters 58(4) numbers 1, 2, 3, 4, 5, 6, 7 and 8. Four optical fibers 20(4) from fiber optic cable 18(4) which may be a 4 fiber ribbon cable connect to the internal ends of the fiber optic adapters 58(4), numbers 1, 2, 3 and 4. In this way, optical connection is established between the four of the optical fibers 78 and the four optical fibers 20(4) of the fiber optic cable 18(4). The fiber optic cable 18(4) may be spliced to another fiber optic cable 42(4) by or via mass splice 38(4) which may be a distribution cable. Four individual optical fibers 44(4) connect to the internal ends of the fiber optic adapters 58(4), numbers 5, 6, 7 and 8. In this way, optical connection is established between the other four of the optical fibers 78 and the four optical fibers 44(4) of the fiber optic cable 18(4). The individual optical fibers 44(4) may be spliced to the optical fibers of another fiber optic cable 32(4) by or via a single fiber splices 30(4). The optical fibers 32(4) may be distribution cables for routing to subscriber premises, as an example.

The enclosure 70 may include other fiber optic components for example, without limitation, additional splitters, CWDM, WDM, feeder terminal blocks, distribution terminal blocks, fiber and cable routing guides, and strain relief devices, to name just a few.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive, or bend resistant, optical fiber is ClearCurve® optical fiber, manufactured by Corning Incorporated. Suitable fibers of this type are disclosed, for example, in U.S. Patent Application Publication Nos. 2008/0166094 and 2009/0169163.

Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 9:
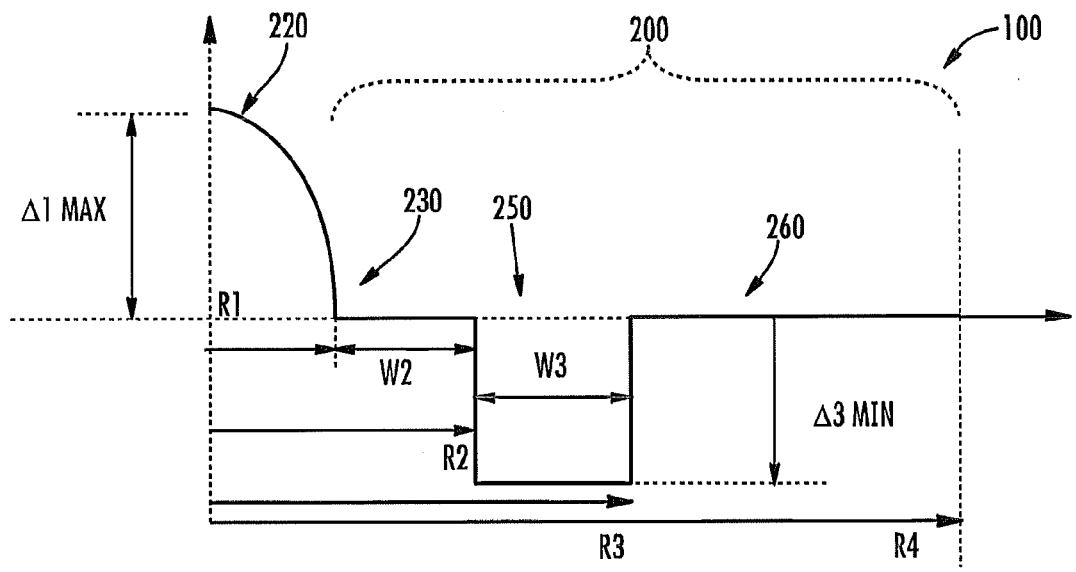
FIG. 9 shows a schematic representation (not to scale) of the refractive index profile of a cross-section of the glass portion of an exemplary embodiment of a multimode optical fiber disclosed herein wherein the depressed-index annular portion is offset from the core and is surrounded by an outer annular portion.
Figure 10:
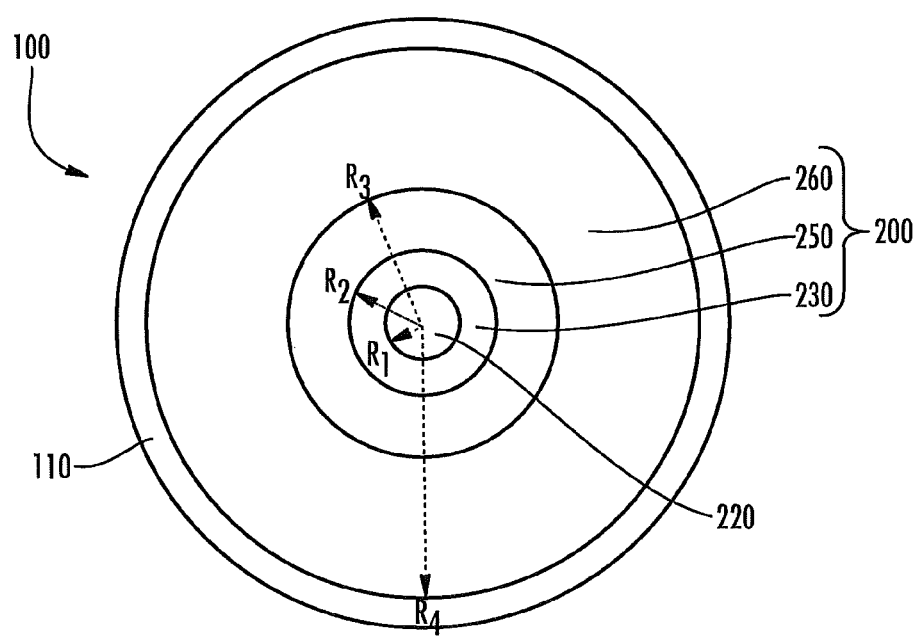
FIG. 10 is a schematic representation (not to scale) of a cross-sectional view of the optical waveguide fiber of FIG. 9.

FIG. 9 shows a schematic representation of the refractive index profile of a cross-section of the glass portion of an exemplary embodiment of a multimode optical fiber 100 comprising a glass core 220 and a glass cladding 200, the cladding comprising an inner annular portion 230, a depressed-index annular portion 250, and an outer annular portion 260. FIG. 10 is a schematic representation (not to scale) of a cross-sectional view of the optical waveguide fiber of FIG. 9. The core 220 has outer radius R1 and maximum refractive index delta Δ1MAX. The inner annular portion 230 has width W2 and outer radius R2. Depressed-index annular portion 250 has minimum refractive index delta percent Δ3MIN, width W3 and outer radius R3. The depressed-index annular portion 250 is shown offset, or spaced away, from the core 220 by the inner annular portion 230. The annular portion 250 surrounds and contacts the inner annular portion 230. The outer annular portion 260 surrounds and contacts the annular portion 250. The clad layer 200 is surrounded by at least one coating 110, which may in some embodiments comprise a low modulus primary coating and a high modulus secondary coating.

The inner annular portion 230 has a refractive index profile Δ2(r) with a maximum relative refractive index Δ2MAX, and a minimum relative refractive index Δ2MIN, where in some embodiments Δ2MAX=Δ2MIN. The depressed-index annular portion 250 has a refractive index profile Δ3(r) with a minimum relative refractive index Δ3MIN. The outer annular portion 260 has a refractive index profile Δ4(r) with a maximum relative refractive index Δ4MAX, and a minimum relative refractive index Δ4MIN, where in some embodiments Δ4MAX=Δ4MIN. Preferably, Δ1MAX>Δ2MAX>Δ3MIN. In some embodiments, the inner annular portion 230 has a substantially constant refractive index profile, as shown in FIG. 9 with a constant Δ2(r); in some of these embodiments, Δ2(r)=0%. In some embodiments, the outer annular portion 260 has a substantially constant refractive index profile, as shown in FIG. 9 with a constant Δ4(r); in some of these embodiments, Δ4(r)=0%. The core 220 has an entirely positive refractive index profile, where Δ1(r)>0%. R1 is defined as the radius at which the refractive index delta of the core first reaches value of 0.05%, going radially outwardly from the centerline. Preferably, the core 220 contains substantially no fluorine, and more preferably the core 220 contains no fluorine. In some embodiments, the inner annular portion 230 preferably has a relative refractive index profile Δ2(r) having a maximum absolute magnitude less than 0.05%, and Δ2MAX<0.05% and Δ2MIN>−0.05%, and the depressed-index annular portion 250 begins where the relative refractive index of the cladding first reaches a value of less than −0.05%, going radially outwardly from the centerline. In some embodiments, the outer annular portion 260 has a relative refractive index profile Δ4(r) having a maximum absolute magnitude less than 0.05%, and Δ4MAX<0.05% and Δ4MIN>−0.05%, and the depressed-index annular portion 350 ends where the relative refractive index of the cladding first reaches a value of greater than −0.05%, going radially outwardly from the radius where Δ3MIN is found.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims.

It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A pigtail cable assembly, comprising:
   a mid-section comprising a fiber optic cable having a plurality of optical fibers;
   a first end section extending from the mid-section, wherein the plurality of optical fibers are separated from the fiber optic cable at the first end section, and wherein the plurality of optical fibers are connectorized at a first end by fiber optic connectors; and
   a second end section extending from the mid-section, wherein one or more of the plurality of the optical fibers at the second end section are adapted to be connected to a single fiber splice at a second end, and wherein the mid-section of the fiber optic cable is adapted to be connected to a mass splice at a sever point, and wherein the pigtail assembly is adapted to be installed in a cassette, and wherein the cassette comprises fiber optic adapters, and wherein at least one of the connectorized optical fiber connects to one of the fiber optic adapters via the fiber optic connector at the first end.

2. The pigtail cable assembly of claim 1, wherein the fiber optic cable is a ribbon cable.

3. The pigtail cable assembly of claim 1, wherein the mass splice is a mass mechanical splice.

4. The pigtail cable assembly of claim 1, wherein the mass splice is a mass fusion splice.

5. The pigtail cable assembly of claim 1, wherein the single fiber splice is a mechanical splice.

6. The pigtail cable assembly of claim 1, wherein the single fiber splice is a fusion splice.

7. The pigtail cable assembly of claim 1, wherein the mid-section is about 24 inches in length.

8. The pigtail cable assembly of claim 1, wherein the first end section is about 12 inches in length.

9. The pigtail cable assembly of claim 1, wherein the second end section is about 24 inches in length.

10. The pigtail assembly of claim 1, wherein the cassette comprises single fiber splices, and wherein at least one of the plurality of optical fibers connects to one of the single fiber splices at the second end.

11. The pigtail assembly of claim 1, wherein the cassette comprises a mass splice, and wherein the fiber optic cable connects to the mass splice at an interface point.

12. A pigtail cable assembly, comprising:
a mid-section comprising a fiber optic cable having a first plurality of optical fibers;
a first end section extending from the mid-section, wherein the first plurality of optical fibers are separated from the fiber optic cable at the first end section other than via a furcation device, and wherein one or more of the first plurality of optical fibers are connectorized at a first end by fiber optic connectors;
a second end section extending from the mid-section, wherein a second plurality of optical fibers are separated from the fiber optic cable at the second end section other than via a furcation device; and
a sever site on the mid-section, wherein one of the second plurality of the optical fibers at the second end section is adapted to be connected to a single fiber splice at a second end when single fiber splicing is intended, and wherein the mid-section of the fiber optic cable is adapted to be connected to a mass splice at the sever site when the second end section is separated from the mid-section at an interface point when mass fiber splicing is intended, and
wherein the pigtail assembly is adapted to be installed in a cassette, and wherein the cassette comprises fiber optic adapters, and wherein at least one of the connectorized optical fiber connects to one of the fiber optic adapters via the fiber optic connector at the first end.

13. The pigtail cable assembly of claim 12, wherein the first plurality of optical fibers and the second plurality of optical fibers comprise the same number of optical fibers.

14. The pigtail cable assembly of claim 12, wherein the first plurality of optical fibers and the second plurality of optical fibers comprise different number of optical fibers.

15. The pigtail cable assembly of claim 12, wherein one of a first portion of the second plurality of optical fibers is adapted to be connected to the single fiber splice at the second end and a second portion of the second plurality of optical fibers is adapted to be connected to a mass splice at the interface point.

16. The pigtail assembly of claim 12, wherein the cassette comprises a single fiber splice holder, and wherein one of the second plurality of optical fibers terminates at the single fiber splice holder at the second end for splicing to another optical fiber.

17. The pigtail assembly of claim 12, wherein the cassette comprises a mass splice holder, and wherein the fiber optic cable terminates at the mass splice holder at the conversion point at a conversion point for splicing to another fiber optic cable.

* * * * *